(12) United States Patent
Chow et al.

(10) Patent No.: US 8,732,176 B2
(45) Date of Patent: May 20, 2014

(54) WEB-BASED TOOL FOR DETECTING BIAS IN REVIEWS

(75) Inventors: Richard Chow, Sunnyvale, CA (US); Philippe J.P. Golle, San Francisco, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 826 days.

(21) Appl. No.: 12/431,556

(22) Filed: Apr. 28, 2009

(65) Prior Publication Data

US 2010/0274791 A1 Oct. 28, 2010

(51) Int. Cl.
*G06F 17/30* (2006.01)
(52) U.S. Cl.
USPC .......................................... 707/748; 707/758
(58) Field of Classification Search
USPC .................................. 707/748, E17.014, 758
See application file for complete search history.

(56) References Cited

U.S. PATENT DOCUMENTS

| | | | |
|---|---|---|---|
| 7,519,562 B1* | 4/2009 | Vander Mey et al. | 705/500 |
| 2003/0154194 A1* | 8/2003 | Jonas | 707/3 |
| 2005/0034071 A1* | 2/2005 | Musgrove et al. | 715/530 |
| 2007/0136265 A1* | 6/2007 | Hunt et al. | 707/4 |
| 2009/0144255 A1* | 6/2009 | Chow et al. | 707/5 |
| 2009/0228830 A1* | 9/2009 | Herz et al. | 715/808 |

OTHER PUBLICATIONS

Jessica Staddon and Richard Chow, Detecting Reviewer Bias through Web-Based Association Mining, WICOW'08, Oct. 30, 2008, Napa Valley, California, USA. Copyright 2008 ACM 978-1-60558-259-7/08/10.*

* cited by examiner

*Primary Examiner* — Shiow-Jy Fan
(74) *Attorney, Agent, or Firm* — Shun Yao; Park, Vaughan, Fleming & Dowler LLP

(57) ABSTRACT

One embodiment provides a computer system for detecting associations between a reviewer and an entity under review. During operation, the system estimates a relationship strength between the reviewer and the entity under review, and determines whether the relationship strength between the reviewer and the entity under review exceeds a predetermined threshold.

20 Claims, 9 Drawing Sheets

WEB-BASED TOOL FOR DETECTING BIAS IN REVIEWS

BACKGROUND

1. Field

This disclosure is generally related to online reviews. More specifically, this disclosure is related to detecting bias in online reviews.

2. Related Art

Online retailers, such as Amazon.com Inc. of Seattle, Wash. and eBay Inc. of San Jose, Calif., encourage their user-communities to contribute user reviews, including reviews to the products being sold or reviews to the associated sellers. User reviews are important to the online retailers because they attract customers, and thus can have a positive impact on the number of sales.

However, in order for the user reviews to work properly, the user-communities often need to be monitored. Without proper supervision, there is a risk that the value of the review content will be diluted by biased or otherwise erroneous posts. For example, positive reviews are sometime written by the businesses or individuals being reviewed, while negative reviews may be written by competitors, disgruntled employees, or anyone with a grudge against the business being reviewed. To monitor online user reviews, one popular approach is to rely on the self-regulation of the user-community in the form of ratings and comments. For example, Amazon.com provides a feature for a reader of a product review to indicate whether the review was helpful. The ratings of the reviews are generally based on the content of the associated reviews, and possibly, the reviewer's review history in the community, as this is often the only information that is readily available to the user community. Thus, the self-regulation system as it commonly exists today does not support the discovery of information external to the user community, such as the ties between a reviewer and the business to be reviewed. Such information can be valuable when detecting a potential bias on the part of the reviewer.

SUMMARY

One embodiment provides a computer system for detecting associations between a reviewer and an entity under review. During operation, the system estimates a relationship strength between the reviewer and the entity under review, and determines whether the relationship strength between the reviewer and the entity under review exceeds a predetermined threshold.

In a variation on this embodiment, the entity under review is a service, a product, or an entity associated with the service or product.

In a further variation, the system reports a potential bias of the reviewer toward the entity under review when the relationship strength between the reviewer and the entity under review exceeds the threshold.

In a variation on this embodiment, estimating the relationship strength includes issuing a first search query for the reviewer, retrieving a number of returned hits for the first search query, issuing a joint search query for the reviewer and the entity under review, retrieving a number of returned hits for the joint search query, and calculating a ratio of the number of returned hits for the joint search query to the number of returned hits for the first search query.

In a further variation, estimating the relationship strength further includes issuing a second search query for the entity under review, retrieving a number of returned hits for the second search query, and calculating a ratio of the number of returned hits for the joint search query to the number of returned hits for the second search query.

In a further variation, the search query is a Web search engine query.

In a variation on this embodiment, the system identifies a first number of terms correlated with the reviewer and a second number of terms correlated with the entity under review.

In a further variation, the system estimates relationship strengths between each term of the first number of terms and the entity under review, and estimates relationship strengths between each term of the second number of terms and the reviewer.

In a variation on this embodiment, the entity under review is a product of a first company or the first company, and if the relationship strength between the reviewer and the entity under review is below the threshold, the system estimates a relationship strength between the reviewer and a second company which is a competitor of the first company, and determines whether the relationship strength between the reviewer and the second company exceeds the predetermined threshold.

Figure 1:
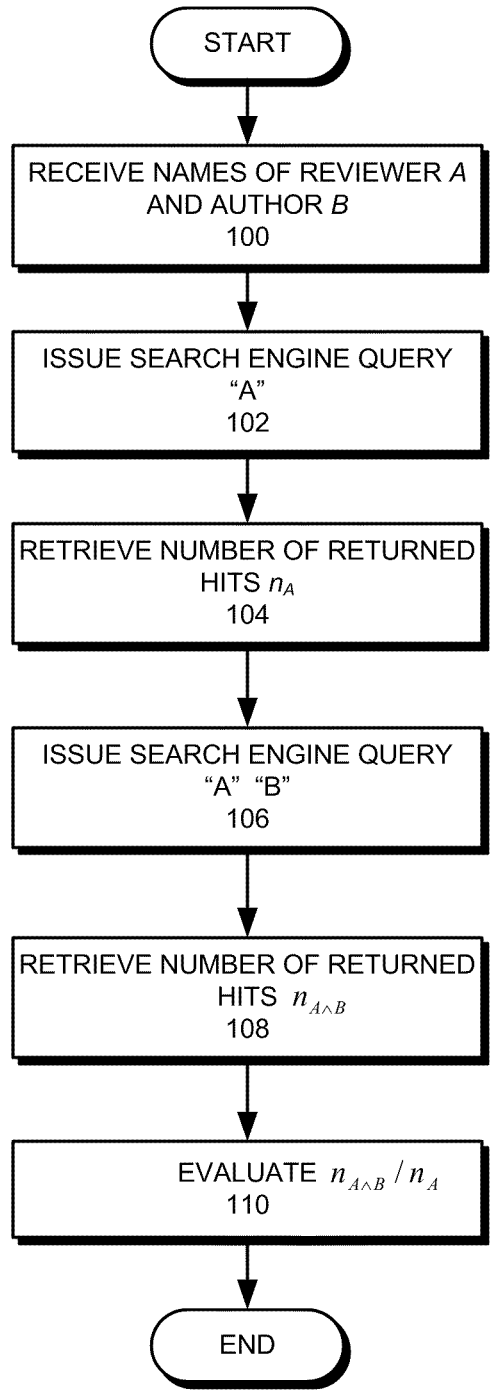
FIG. 1 presents a flow chart illustrating the process of evaluating the confidence of an association rule Reviewer A⇒Author B in accordance with an embodiment of the present invention.

Table 1 presents the evidence found for the 20 identified associations in accordance with an embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Reviewer bias has become an issue for online retailers who rely on reviews from their user-community to boost sales. The current approach for detecting biased or erroneous reviews relies on the self-regulation of the user communities. Such a system does not support discovery of information external to the user community, such as personal or professional ties between a book reviewer and an author. Embodiments of the present invention provide a system for assessing the validity of online reviews that aims to bring the broader context of the reviewer into the online community. The system mines the World Wide Web (the Web) to discover association rules that impact review bias. In particular, the system looks for association rules between reviewers and creators of the products (such as authors) or services they review.

In the example of online book reviews, an association rule of the form Reviewer A $\Rightarrow$ Author B reflects that Author B is frequently mentioned in Web documents that also mention Reviewer A. Certainly, co-occurrence in a single Web document is insufficient evidence of a relationship. However, when the co-occurrence is repeated across a large number of documents that are also a significant fraction of the documents containing either one of the names, it becomes compelling evidence of a relationship.

To detect a potential review bias, the bias-detection system issues search engine queries and studies the returned hits of those queries. The ratio of the number of Web documents containing both the reviewer's and the author's names to the number of Web documents containing either one's name can be used to estimate the confidence level of the association rule. A high confidence association rule indicates possible review bias.

In addition to discovering direct associations between an author and a reviewer, the system can also discover indirect associations. To do so, the system first identifies a number of terms that associate with the author for the book under review. Then the system determines the confidence level of the association rules between the identified terms and the reviewer, which can in turn indicate possible indirect associations between the author and the reviewer.

Note that although the following descriptions use detecting reviewer bias in online book reviews as an example, various embodiments of the present invention can also be applied to other types of review processes, such as a customer's or an expert's review toward a product, or a buyer's review toward a seller on eBay, and vise versa.

Association Rule

The bias-detection system detects potential review bias by association rule mining. In the example of online book reviews, the problem of association rule mining over the Web can be defined as:

Let I={$i_1, i_2, \ldots, i_n$} be a set of items, such as the names of book reviewers and authors. Let D={$t_1, t_2, \ldots, t_n$} be a set of Web documents called the database. Each document in D contains a subset of the items in I. For example, one or more names in I may appear on a Web document. In the setting of online book reviews, an association rule can be defined as an implication in the form A$\Rightarrow$B, where A is the name of a reviewer of a book authored by B, or B is the name of a reviewer of a book authored by A. The rule A$\Rightarrow$B is said to have high confidence if Pr(B|A), which is the probability of finding B in Web documents under the condition that these documents also contain A. In addition, the rule A$\Rightarrow$B is said to have large support if Pr(A $\wedge$ B) is large.

The bias-detection system uses a Web-based association-rule-mining algorithm that takes the names of authors and reviewers as input. The algorithm estimates the confidence of an association rule based on co-occurrence of the reviewer's name and the author's name in Web documents. FIG. 1 presents a flow chart illustrating the process of evaluating the confidence of an association rule Reviewer A $\Rightarrow$ Author B in accordance with an embodiment. The system receives the names of a book reviewer A and an author B (operation 100). The system then issues a search engine query: "A" (operation 102) and retrieves the number of returned hits, $n_A$ (operation 104). Subsequently, the system issues a search engine query: "A" "B" (operation 106) and retrieves the number of returned hits, $n_{A \cdot B}$ (operation 108). To estimate the confidence of association rule Reviewer A $\Rightarrow$ Author B, the system evaluates the ratio of $n_{A \cdot B}$ to $n_A$ (operation 110). Note that, in addition to using the Web as a database, it is also possible to use other information collection or corpus as a database for mining association rules. For example, email logs such as the Enron dataset can also be used for mining association rules.

Review Bias Detection

In order to detect review bias, the system uses a function R($\bullet$) to output a set of reviewers associated with a given author, that is, B$\in$R(A) if and only if B has reviewed a book authored by A. The system also defines a set P which contains pairs of reviewers and book authors, and P={(A,B)|A$\in$R(B) or B$\in$R(A)}. The bias-detection system can be used to determine the associations between all pairs of reviewers and authors in the set P.

Figure 2:
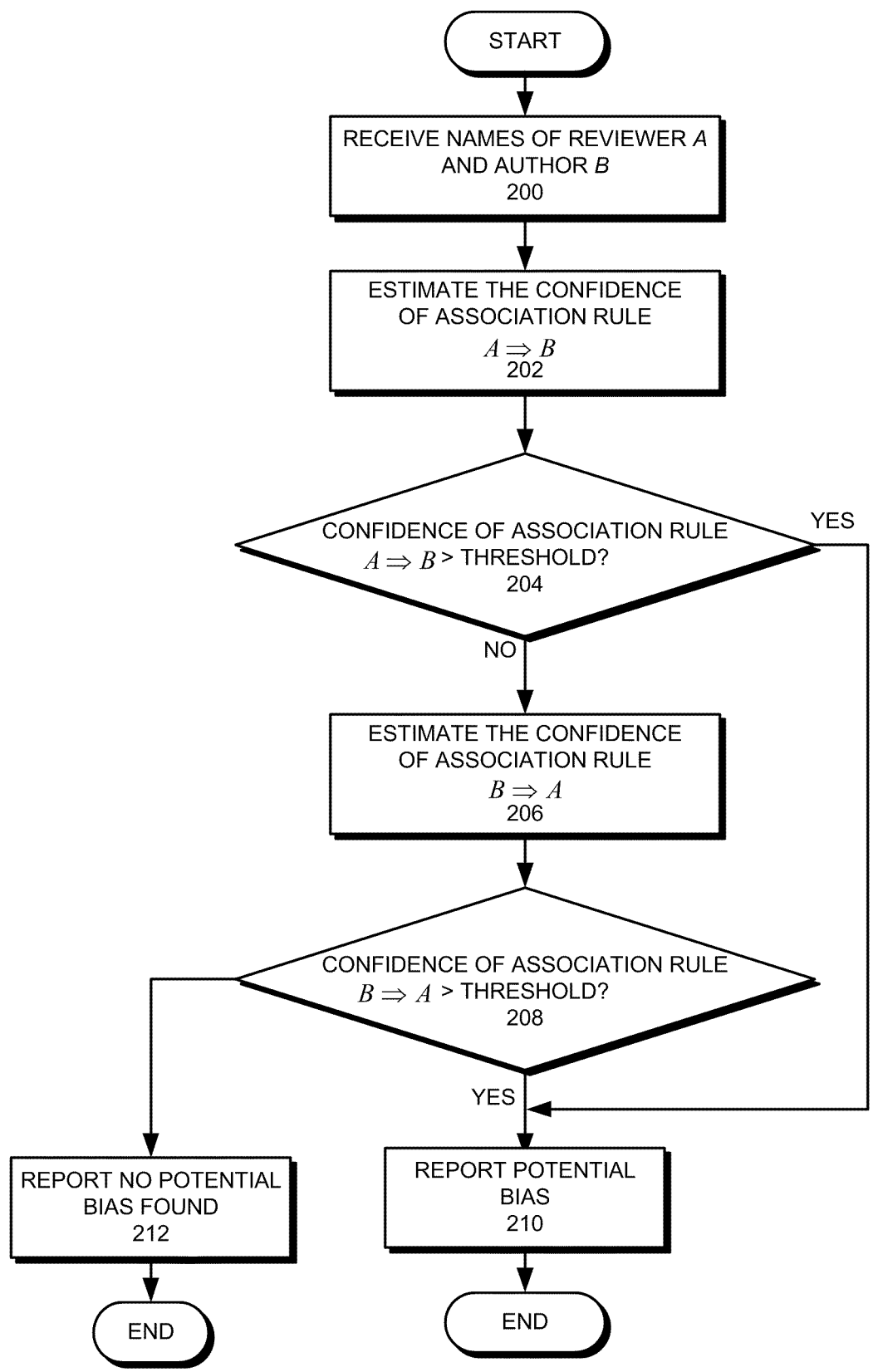
FIG. 2 presents a flow chart illustrating the process of determining whether a book reviewer A has a potential bias toward books authored by Author B in accordance with an embodiment of the present invention.

FIG. 2 presents a flow chart illustrating the process of determining whether a book reviewer A has a potential bias toward books authored by B in accordance with an embodiment. The system receives the names of a book reviewer A and an author B (operation 200). The system estimates the confidence of association rule A$\Rightarrow$B (operation 202) and compares the confidence with a predetermined threshold (operation 204). If the confidence of association rule A$\Rightarrow$B exceeds a predetermined threshold, the system reports that there is a potential bias for reviewer A toward books authored by B (operation 210). Otherwise, the system estimates the confidence of association rule B$\Rightarrow$A (operation 206) and compares the confidence with a predetermined threshold (operation 208). If the confidence of association rule B$\Rightarrow$A exceeds a predetermined threshold, the system reports that there is a potential bias for reviewer A toward books authored by B (operation 210). Otherwise, the system reports no potential bias is detected (operation 212).

To demonstrate that the aforementioned method can effectively detect review bias, a test was performed using a set of reviewed books. The set includes 64 books, which are selected from Amazon.com under the category of "cryptography." All 64 books have no more than 20 reviews, and the reviewers under study report both a first and last name in their reviews. The system issued Google™ (a trademark of Google Inc., Mountain View, Calif.) search queries, for each author name, each reviewer name, and each pair of author-reviewer names, and recorded the number of hits returned. There were an average of 1.44 authors per book, an average of 3.45 reviewers per book, and 305 author-reviewer pairs, leading to a total of 620 Google™ search engine queries for the 64 books.

TABLE 1

The evidence found for the 20 identified associations

| Association Evidence | Number of Pairs |
| --- | --- |
| Co-authors on a published work | 11 |
| Acknowledgment in a published work | 1 |
| Academic advisor and advisee | 1 |
| Interviewer and interviewee in a published article | 2 |
| Co-organizers of a conference | 1 |
| Co-members of standard committee | 2 |
| Speakers at the same conference | 2 |

The first page of hits for each author-reviewer pair is manually reviewed for evidence of an association between the reviewer and the author. Such an association can serve as a "ground truth" when evaluating the output of the bias-detection algorithm. The manual process discovered 20 associations as shown in Table 1. The reasons for the associations range in strength, with co-authorship being strong evidence of an association, and presentations at the same conference being much weaker (because it does not imply that the speakers have any interaction at the conference, or that they know each other).

Figure 3:
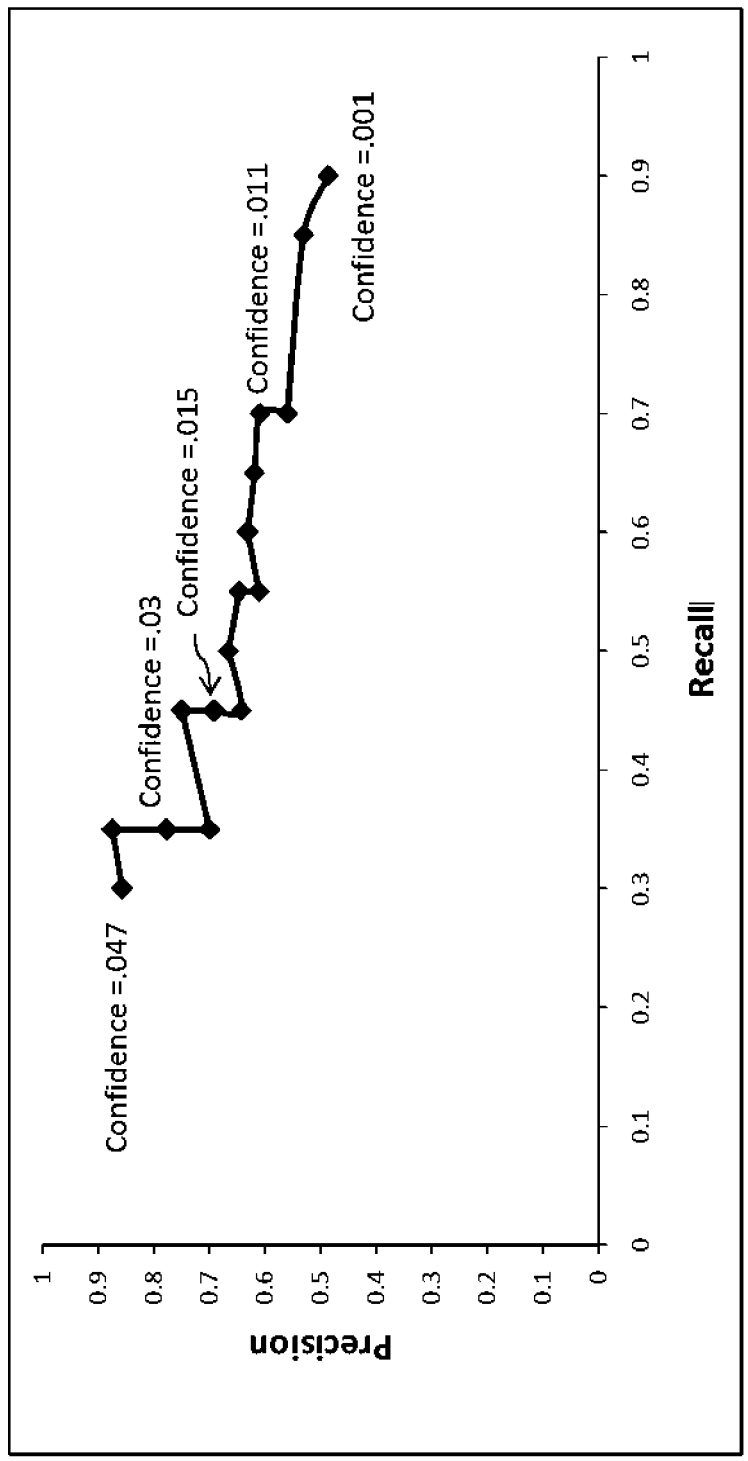
FIG. 3 presents a graph illustrating the calculated recall-precision points for different minimum confidence values in accordance with an embodiment of the present invention.

For accuracy, the system considers only author-reviewer pairs with a minimum number of Google™ hits of 10, and calculates the confidence of these associations using the method illustrated in FIG. 1. To verify the effectiveness of the bias-detection algorithm, the precision and recall of the algorithm with respect to the 20 manually identified (true) associations are calculated using several minimum confidence values. That is, for a minimum confidence value of c, the precision is the fraction of the associations with a confidence value of at least c that are true associations, and the recall is the fraction of the true associations that have a confidence value of at least c. For example, if c=0, the algorithm produces all the author-reviewer pairs; thus, the precision is 20/305 and the recall is 1. FIG. 3 presents a graph illustrating the calculated recall-precision points for different minimum confidence values. The graph indicates the bias-detection algorithm yields high precision (i.e., identified associations are true ones).

Indirect Associations

Figure 4A:
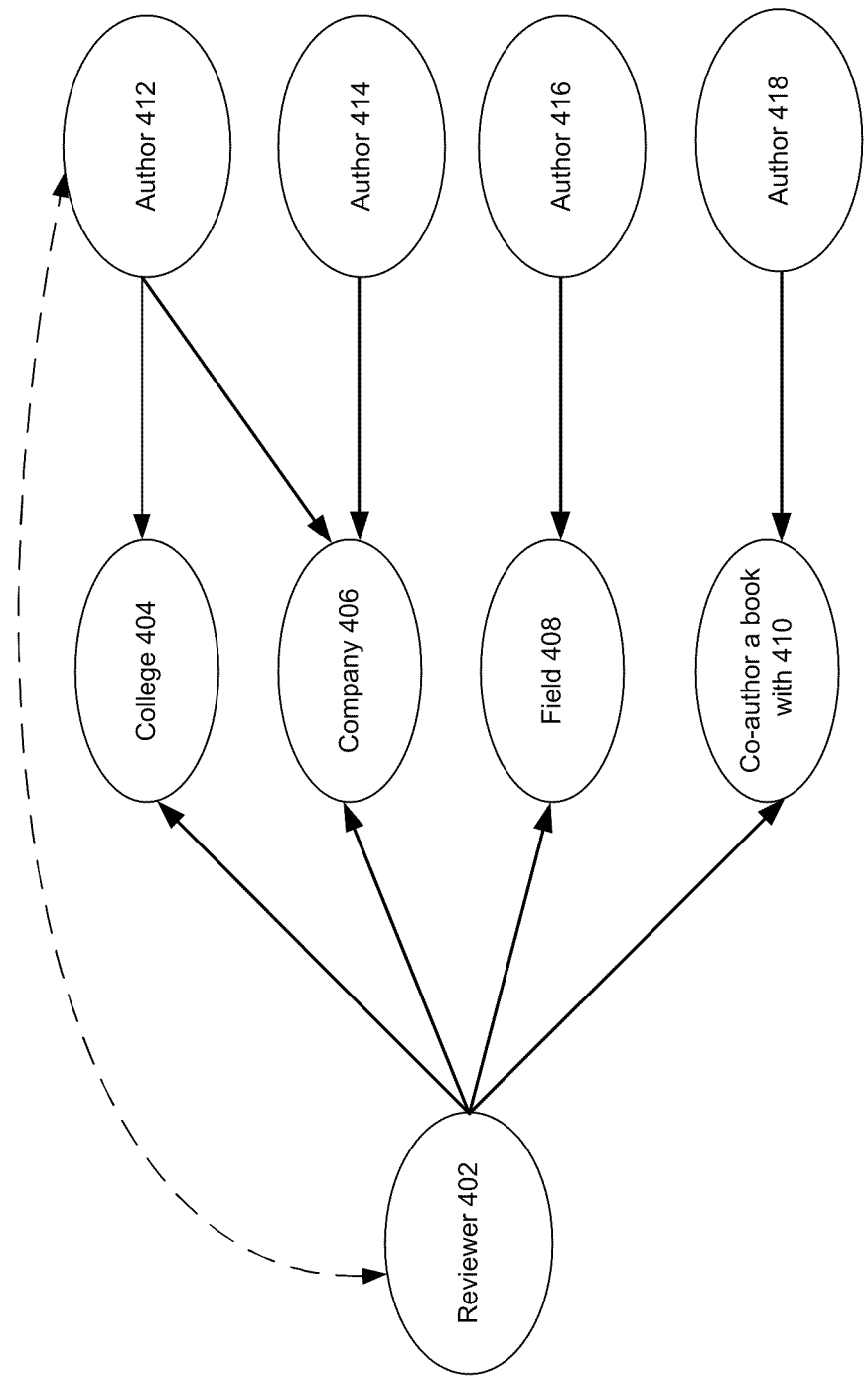
FIG. 4A presents a diagram illustrating possible indirect associations found between a book reviewer and a group of authors in accordance with an embodiment of the present invention.

In addition to detecting direct associations between book reviewers and book authors, the bias detection algorithm can also be used to detect an indirect association. FIG. 4A presents a diagram illustrating possible indirect associations found between a book reviewer and a group of authors in accordance with one embodiment of the present invention. For example, based on the online search results, a book reviewer 402 is found to: have graduated from a college 404, have worked in a company 406, be in a field 408, and have co-authored a book with an author 410. Online search queries for a group of authors 412-418 return that author 412 graduated from college 404, author 414 is working for company 406, author 416 is in the field 408, and author 418 has co-authored a different book with author 410. Although there is no direct association between reviewer 402 and authors 412-418, as joint queries for reviewer 402 and authors 412-418 return empty, based on the fact that they associate with a common term, reviewer 402 is said to have an indirect association with book authors 412-418. Consequently, there is a potential bias for reviewer 402 toward books authored by authors 412-418. Note that a term can include one or more words (e.g., a phrase), and it can be, but is not limited to: a person, an institution, a company, a product, and a subject. Note that there can be more than one potential indirect association between reviewer 402 and one of the authors. For example, in addition to graduating from college 404, author 412 is also found to have worked for company 406. In order to detect indirect associations between a reviewer and a book author, the system first selects a number of terms that are associated with the reviewer, and then discovers association rules between a book author and the selected terms. If the system discovers a high confidence between the book author and the terms that are associated with the reviewer, the system determines that the reviewer may have a potential bias toward books authored by the book author. The system also performs a reverse search by starting with the book author. During the reverse search, the system first identifies terms associated with the book author, and then mines the Web for association rules between the reviewer and the identified terms.

Figure 4B:
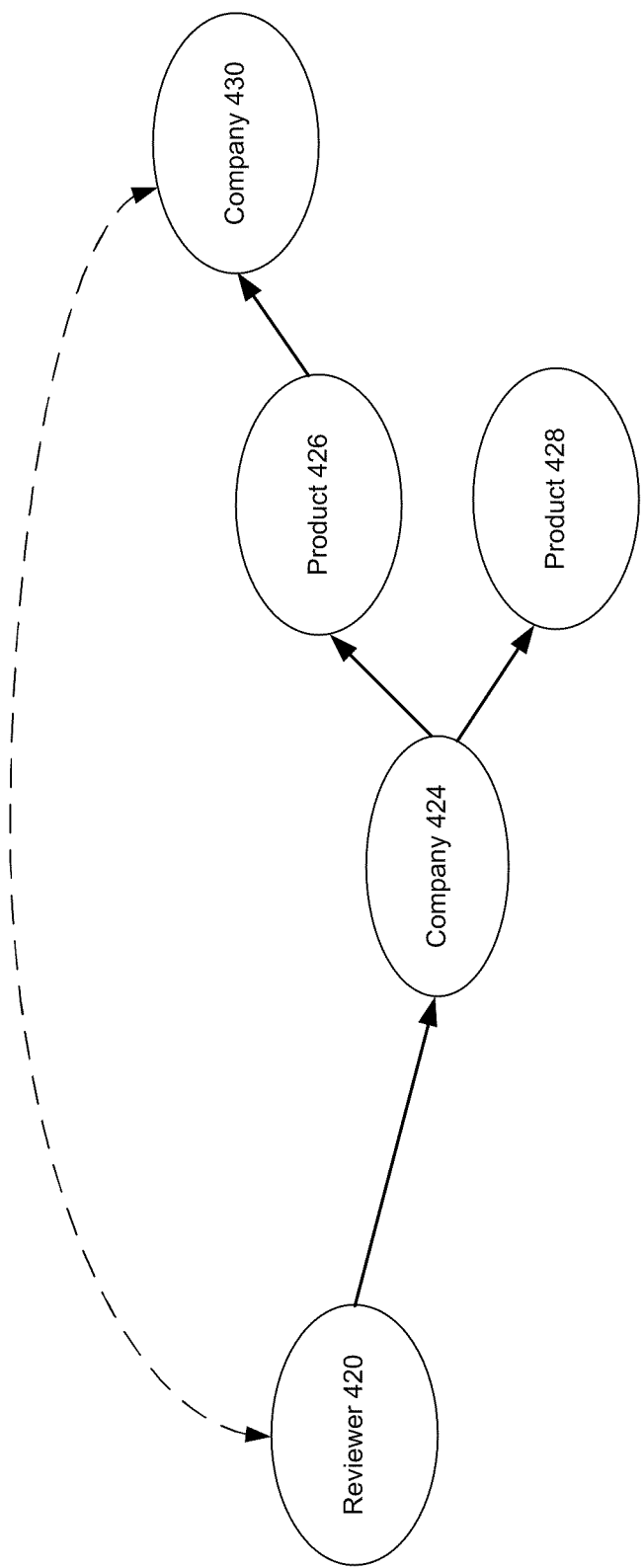
FIG. 4B presents a diagram illustrating possible indirect associations found between a product reviewer and a group of companies in accordance with an embodiment of the present invention

In addition to the indirect associations shown in FIG. 4A, embodiments of the present invention can also discover other types of indirect associations including an adversary relationship. FIG. 4B presents a diagram illustrating possible indirect associations found between a product reviewer and a group of companies in accordance with one embodiment of the present invention. In FIG. 4B, online reviewer 420 is working for a company 424. Company 424 is found to be the maker of a product 426 and a product 428. Further searches reveal that a company 430 also makes product 426. Apparently, company 430 is the competitor of company 424. Thus, although reviewer 420 is not directly associated with company 430, the competitor relationship between company 424 and company 430 implies a possible adversary relationship between reviewer 420 and company 430. As one can see from FIG. 4B, such an indirect relationship may include more than one intermediate "node."

Figure 5:
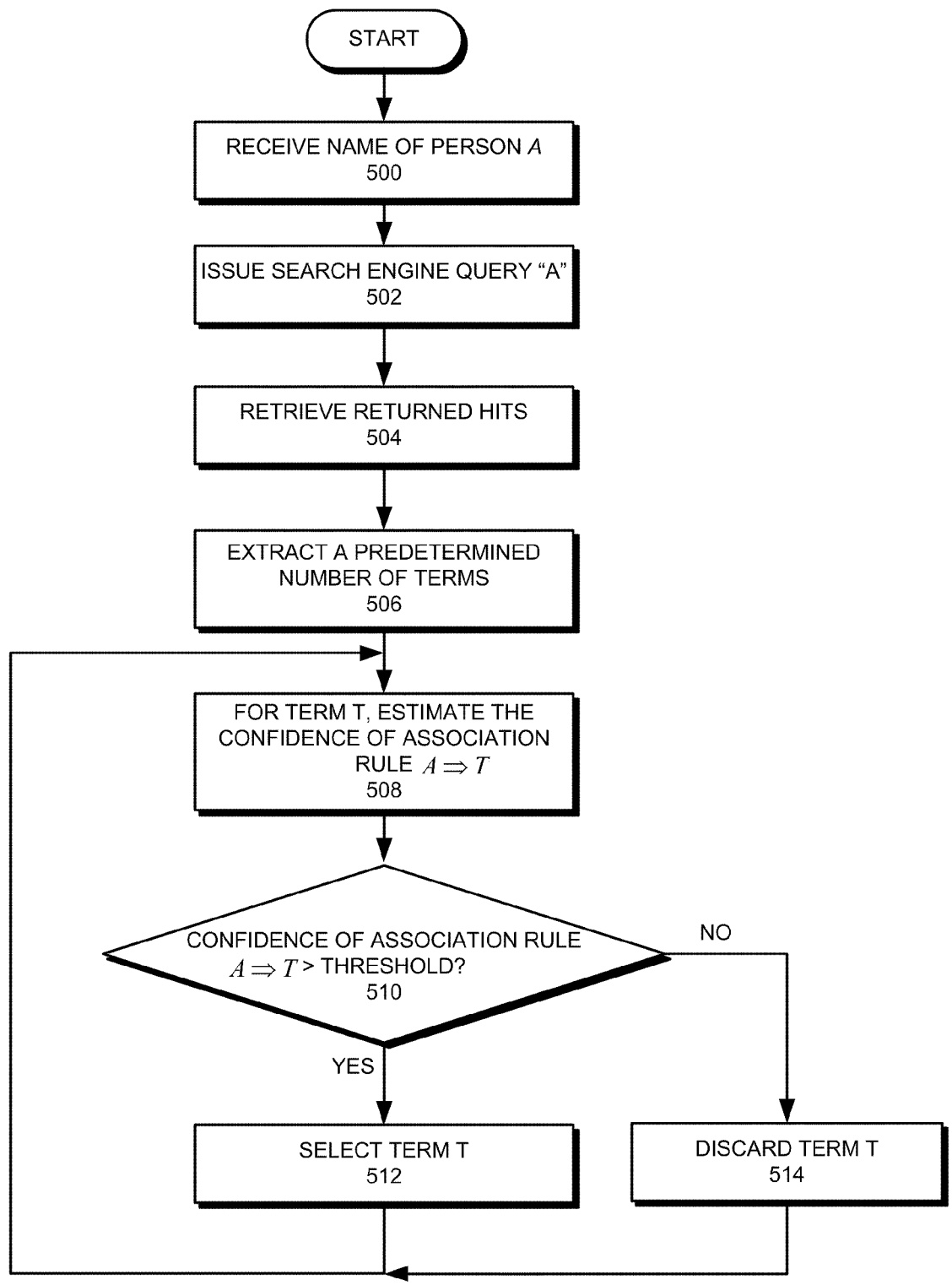
FIG. 5 presents a flow chart illustrating the process of identifying a number of terms that are associated with a person in accordance with an embodiment of the present invention.

FIG. 5 presents a flow chart illustrating the process of identifying a number of terms that are associated with a person in accordance with an embodiment. The system first receives the name of a person A (operation 500). The system then issues a search engine query "A" (operation 502) and retrieves a number of returned hits (operation 504). Based on the returned hits, the system extracts a predetermined number of terms (operation 506). This predetermined number can be a large number, such as 100. For a term T, the system estimates the confidence of association rule $A \Rightarrow T$ (operation 508) and compares it with a predetermined threshold (operation 510). If the confidence exceeds the threshold, the system selects term T as a term associated with person A (operation 512); otherwise, the systems discard term T (operation 514). The system then moves to the next term (operation 508).

Figure 6:
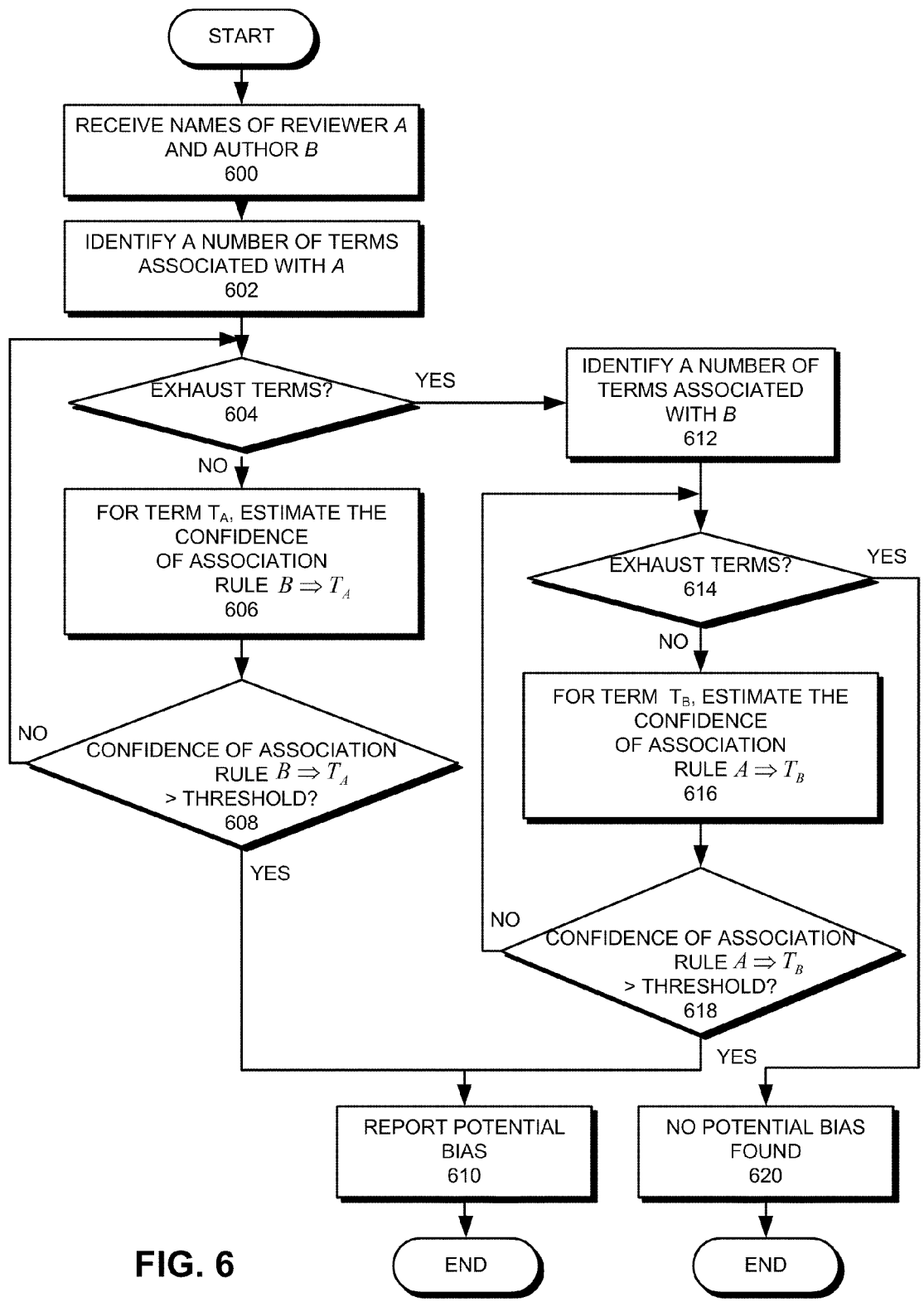
FIG. 6 presents a flow chart illustrating the process of determining whether a book reviewer A has a potential bias toward books authored by author B in accordance with an embodiment of the present invention.

FIG. 6 presents a flow chart illustrating the process for determining whether a book reviewer A has a potential bias toward books authored by B in accordance with an embodiment. The system receives the names of a book reviewer A and an author B (operation 600). The system identifies a number of terms associated with reviewer A (operation 602), and determines whether the system has evaluated all the terms (operation 604). If not, for a term $T_A$, the system estimates the confidence of association rule $B \Rightarrow T_A$ (operation 606) and compares the confidence with a predetermined threshold (operation 608). If the confidence exceeds the threshold, the system reports a potential bias (operation 610); otherwise, the system moves to the next term (operation 604).

If the system has exhausted all the terms associated with reviewer A, the system identifies a number of terms associated with author B (operation 612), and determines whether the system has evaluated all the terms (operation 614). If not, for a term $T_B$, the system estimates the confidence of association rule $A \Rightarrow T_B$ (operation 616) and compares the confidence with a predetermined threshold (operation 618). If the confidence exceeds the threshold, the system reports a potential bias (operation 610); otherwise, the system moves to the next term (operation 614). If the system has exhausted all terms associated with author B, the system reports no potential bias found (operation 620).

Note that in another embodiment, the system not only reports a potential bias of a reviewer toward an author, but also reports the types of associations between the reviewer and the author. In one embodiment, the system may report all associations between a reviewer and an author. In other words, the system does not stop when a potential bias is found, but continues to mine association rules until all associated terms are evaluated. In addition, the system may rank the association relationships between a reviewer and an author based on relevance. For example, co-authoring a book is a stronger association compared with working in the same field. By providing readers of the book reviews all possible associations between the book reviewer and the book author, the system makes it possible for readers to evaluate the validity of the review.

Figure 7:
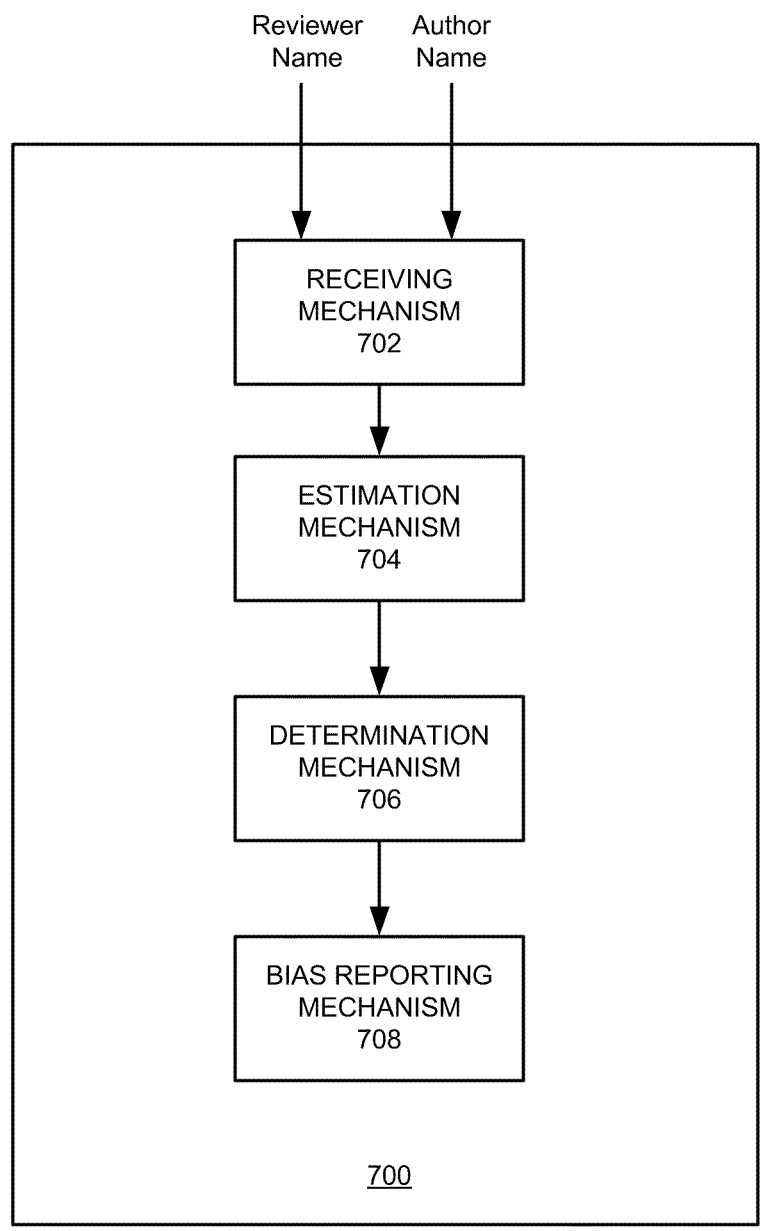
FIG. 7 presents a block diagram illustrating a system for detecting online review bias in accordance with an embodiment of the present invention.

FIG. 7 presents a block diagram illustrating a system for detecting online review bias in accordance with one embodiment of the present invention. As shown in FIG. 7, bias-detection system 700 includes a receiving mechanism 702, a estimation mechanism 704, a determination mechanism 706, and a bias reporting mechanism 708. Receiving mechanism 702 receives the names of the reviewer and author. Estimation mechanism 704 estimates the confidence values of the association rules, and determination mechanism 706 determines whether the confidence values have exceeded a predetermined threshold. If so, bias reporting mechanism 708 reports that the reviewer has a potential bias toward books authored by the author.

Figure 8:
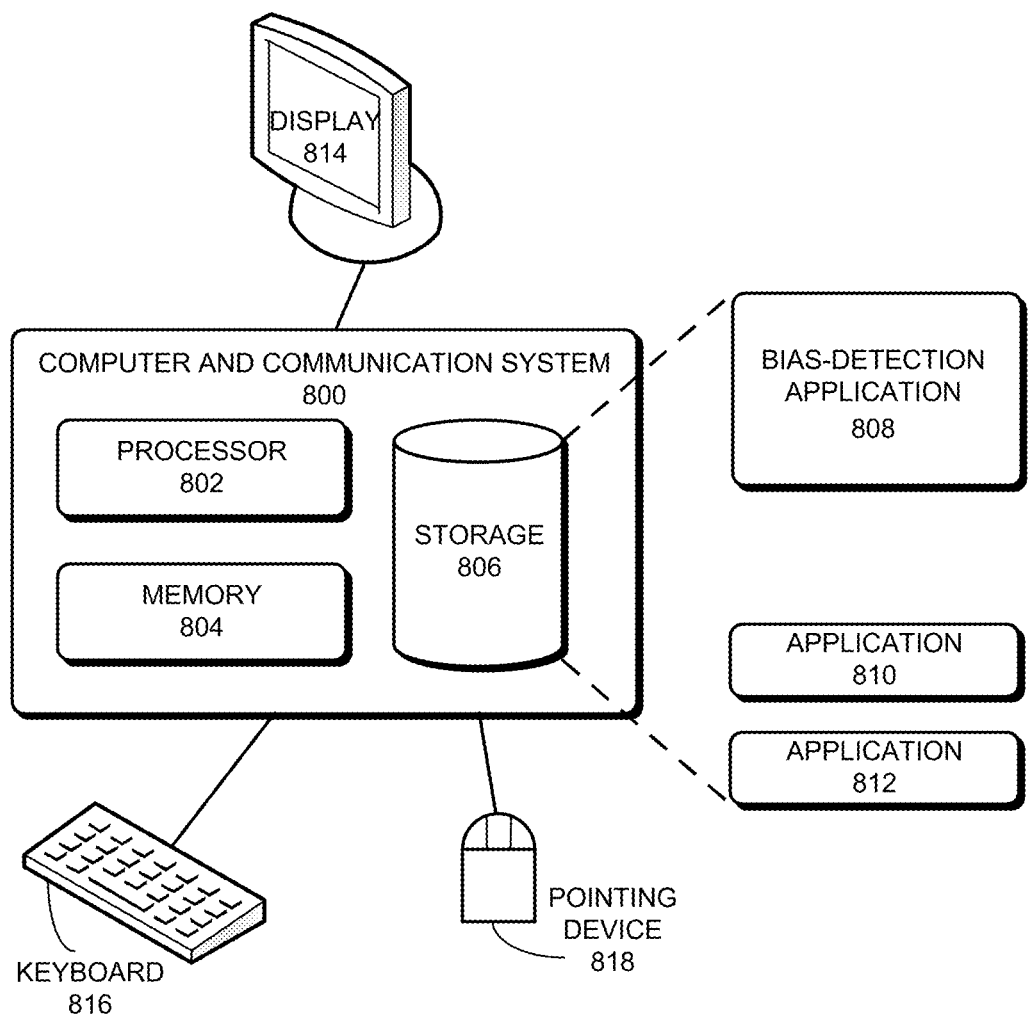
FIG. 8 illustrates an exemplary computer system for detecting online review bias in accordance with an embodiment of the present invention.

FIG. 8 illustrates an exemplary computer system for detecting online review bias in accordance with one embodiment of the present invention. In one embodiment, a computer and communication system 800 includes a processor 802, a memory 804, and a storage device 806. Storage device 806 stores a bias-detection application 808, as well as other applications, such as applications 810 and 812. During operation, bias-detection application 808 is loaded from storage device 806 into memory 804 and then executed by processor 802. While executing the program, processor 802 performs the aforementioned functions. Computer and communication system 800 is coupled to an optional display 814, keyboard 816, and pointing device 818.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer system for detecting associations between a reviewer and an entity under review, comprising:
a processor;
a memory;
an identifying mechanism configured to identify a first set of terms associated with the reviewer, wherein identifying the first set of terms involves issuing a search query that includes the reviewer's name, and extracting a predetermined number of terms from the search results;
an estimation mechanism configured to estimate, for a review conducted within a user-community, a first relationship strength between the entity under review and a respective term of the first set of terms associated with the reviewer, wherein estimating the relationship strength involves:
issuing a first search query to determine a first number of documents external to the user-community that indicate the entity under review and the respective term associated with the reviewer;
issuing a second search query to determine a second number of documents that indicate the entity under review; and
calculating a ratio of the first number of documents to the second number of documents;
a determination mechanism configured to determine whether the first relationship strength exceeds a predetermined threshold; and
a bias-reporting mechanism configured to report a potential bias of the reviewer toward the entity under review in response to the first relationship strength exceeding the predetermined threshold.

2. The computer system of claim 1, wherein the entity under review is a service, a product, or an entity associated with the service or product.

3. The computer system of claim 1, wherein the estimation mechanism is further configured to:
issue a third search query for the entity under review;
retrieve a number of returned hits for the third search query; and
calculate a ratio of the number of returned hits for the first search query to the number of returned hits for the third search query.

4. The computer system of claim 1, wherein the search query is a Web search engine query.

5. The computer system of claim 1, further comprising an identifying mechanism configured to identify a second set of terms associated with the entity under review.

6. The computer system of claim 5, wherein the estimation mechanism is further configured to:
estimate relationship strengths between each term of the second set of terms and the reviewer.

7. The computer system of claim 1,
wherein when the first relationship strength between the reviewer and the entity under review is below the threshold,
the estimation mechanism is further configured to estimate a second relationship strength between the reviewer and a second entity and a third relationship strength between the second entity and the entity under review;
the determination mechanism is further configured to determine whether the second relationship strength between the reviewer and the second entity and the third relationship strength between the second entity and the entity under review both exceed the predetermined threshold; and
the bias-reporting mechanism is configured to report a potential bias of the reviewer toward the entity under review based on the determination.

8. A computer-executable method for detecting associations between a reviewer and an entity under review, comprising:
identifying a first set of terms correlated with the reviewer, wherein identifying the first set of terms involves issuing a search query that includes the reviewer's name, and extracting a predetermined number of terms from the search results;
estimating, for a review conducted within a user-community, a first relationship strength between the entity under review and a respective term of the first set of terms associated with the reviewer, wherein estimating the relationship strength involves:
issuing a first search query to determine a first number of documents external to the user-community that indicate the entity under review and the respective term associated with the reviewer;
issuing a second search query to determine a second number of documents that indicate the entity under review; and
calculating a ratio of the first number of documents to the second number of documents;
determining, by a computer, whether the first relationship strength exceeds a predetermined threshold; and
responsive to the first relationship strength exceeding the predetermined threshold, reporting a potential bias of the reviewer toward the entity under review.

9. The method of claim 8, wherein the entity under review is a service, a product, or an entity associated with the service or product.

10. The method of claim 8, wherein estimating the relationship strength further comprises:
issuing a third search query for the entity under review;
retrieving a number of returned hits for the third search query; and
calculating a ratio of the number of returned hits for the first search query to the number of returned hits for the third search query.

11. The method of claim 8, wherein the search query is a Web search engine query.

12. The method of claim 8, further comprising identifying a second set of terms correlated with the entity under review.

13. The method of claim 12, further comprising:
estimating relationship strengths between each term of the second set of terms and the reviewer.

14. The method of claim 12, further comprising:
when the relationship strength between the reviewer and the entity under review is below the threshold,
estimating a second relationship strength between the reviewer and a second entity, and a third relationship strength between the second entity and the entity under review;
determining whether the second relationship strength between the reviewer and the second entity and the third relationship strength between the second entity and the entity under review both exceed the predetermined threshold; and
reporting a potential bias of the reviewer toward the entity under review based on the determination.

15. A non-transitory computer-readable storage medium storing instructions that when executed by a computer cause the computer to perform a method for detecting associations between a reviewer and an entity under review, the method comprising:
identifying a first set of terms correlated with the reviewer, wherein identifying the first set of terms involves issuing a search query that includes the reviewer's name, and extracting a predetermined number of terms from the search results;
estimating, for a review conducted within a user-community, a first relationship strength between the entity under review and a respective term of the first set of terms correlated with the reviewer, wherein estimating the relationship strength involves:
issuing a first search query to determine a first number of documents external to the user-community that indicate the entity under review and the respective term associated with the reviewer;
issuing a second search query to determine a second number of documents that indicate the entity under review; and
calculating a ratio of the first number of documents to the second number of documents;
determining whether the first relationship strength exceeds a predetermined threshold; and
responsive to the first relationship strength exceeding the predetermined threshold, reporting a potential bias of the reviewer toward the entity under review.

16. The computer-readable storage medium of claim 15, wherein the method further comprises:
when the first relationship strength between the reviewer and the entity under review is below the threshold,
estimating a second relationship strength between the reviewer and a second entity and a third relationship strength between the second entity and the entity under review;
determining whether the second relationship strength between the reviewer and the second entity and the third relationship strength between the second entity and the entity under review both exceed the predetermined threshold; and
reporting a potential bias of the reviewer toward the entity under review based on the determination.

17. The computer-readable storage medium of claim 15, wherein the entity under review is a service, a product, or an entity associated with the service or product.

18. The computer-readable storage medium of claim 15, wherein estimating the relationship strength further comprises:
issuing a third search query for the entity under review;
retrieving a number of returned hits for the third search query; and
calculating a ratio of the number of returned hits for the first search query to the number of returned hits for the third search query.

19. The computer-readable storage medium of claim 15, wherein the method further comprises identifying a second set of terms correlated with the entity under review.

20. The computer-readable storage medium of claim 19, wherein the method further comprises:

estimating relationship strengths between each term of the second set of terms and the reviewer.

\* \* \* \* \*